United States Patent [19]

Rostoker

[11] 4,104,074

[45] Aug. 1, 1978

[54] PULVERULENT BOROSILICATE COMPOSITION AND A METHOD OF MAKING A CELLULAR BOROSILICATE BODY THEREFROM

[75] Inventor: David Rostoker, Monroeville, Pa.

[73] Assignee: Pittsburgh Corning Corporation, Pittsburgh, Pa.

[21] Appl. No.: 825,840

[22] Filed: Aug. 18, 1977

Related U.S. Application Data

[62] Division of Ser. No. 685,054, May 10, 1976.

[51] Int. Cl.² ............................................. C03B 1/00
[52] U.S. Cl. .................................. 106/40 V; 65/22; 106/40 R; 106/54; 106/73.4; 106/73.5
[58] Field of Search ................ 106/54, 73.4, 73.5, 106/40 V, 40 R, 75

[56] References Cited

U.S. PATENT DOCUMENTS

| | | | |
|---|---|---|---|
| 1,676,331 | 7/1928 | Hochstein | 106/54 |
| 2,239,551 | 4/1941 | Dalton et al. | 106/54 |
| 3,623,897 | 11/1971 | Wojcik | 106/40 V |
| 3,759,683 | 9/1973 | Dislich et al. | 106/52 UX |
| 3,793,039 | 2/1974 | Rostoker | 106/40 V |
| 3,892,580 | 7/1975 | Messing | 106/40 R |
| 3,979,215 | 9/1976 | Embuem et al. | 106/69 |

*Primary Examiner*—Helen M. McCarthy
*Attorney, Agent, or Firm*—Stanley J. Price, Jr.; John M. Adams

[57] ABSTRACT

An aqueous slurry comprising an intimate mixture of colloidal silica, (preferably an amorphous, precipitated, hydrated silica), caustic potash, boric acid and alumina is first prepared and then dried. The dried aggregates are thereafter crushed, calcined and rapidly quenched. It is preferred to dry the slurry in a spray drier and thereafter omit crushing after drying and to calcine the dried admixture by means of a plasma arc so that the mixture is rapidly quenched after calcination. The calcined mixture is introduced into a crusher, such as ball mill, with a carbonaceous cellulating agent and reduced to a fine pulverulent material. The pulverulent material is then cellulated in a cellulating furnace to form cellular borosilicate bodies. Where desired, the calcined material may be utilized as a ceramic frit.

4 Claims, 1 Drawing Figure

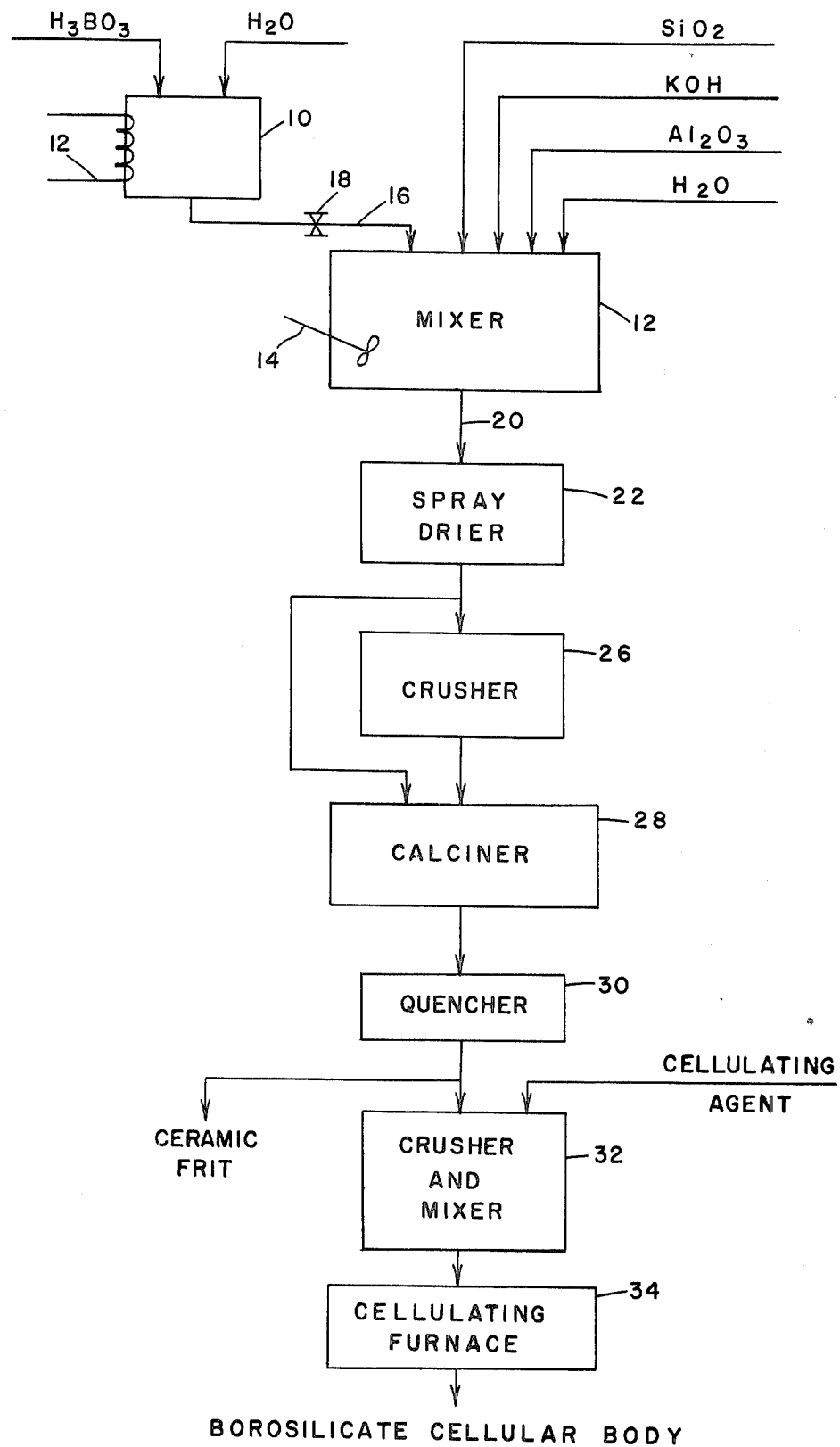

PULVERULENT BOROSILICATE COMPOSITION AND A METHOD OF MAKING A CELLULAR BOROSILICATE BODY THEREFROM

CROSS REFERENCES TO RELATED APPLICATIONS

This application is a division of copending application Ser. No. 685,054 filed on May 10, 1976, entitled "A Pulverulent Borosilicate Composition And A Method Of Making A Cellular Borosilicate Body Therefrom".

BACKGROUND OF THE INVENTION

1. Field of the Invention

This invention relates to a pulverulent borosilicate composition and a method of making a cellular borosilicate body and, more particularly, to a pulverulent borosilicate composition and a cellular body formed without employing conventional glassmaking techniques, such as mixing and melting.

2. Description of the Prior Art

In prior art glass-making technology, it is known to produce borosilicate glasses by the conventional glass-making techniques of mixing and melting. It is also known to produce borosilicate powders by reacting intimate mixtures of silica and boric oxide with or without other oxides at elevated temperatures below the melting point of any of the constituent oxide materials to produce borosilicate powders having certain desired properties. Moreover, it is known, whether produced from an initial melt or as a reaction product from an intimate mixture, borosilicate glasses may be reduced to a fine powder, mixed with a cellulating agent or agents and cellulated to produce a borosilicate cellular glass product.

U.S. Pat. No. 3,762,936 discloses borosilicate glass powder formed directly from an admixture of boric oxide and amorphous silica. U.S. Pat. No. 3,354,024 discloses a process for making cellular glass from a borosilicate glass cullet and a cellulating agent. U.S. Pat. No. 3,793,039 discloses an alumino borosilicate cellular glass body formed from an admixture of clay, anhydrous boric oxide and potassium hydroxide without subjecting the admixture to the conventional melting techniques.

None of the known cellular products produced by the prior art processes have been found capable of providing the following durability criteria: (1) resist degradation by an electrolytic salt bath and corrosive gases at elevated temperatures, (2) resist attack by liquid nonferrous metals and especially attack at an interface zone between an electrolytic salt bath and a liquid metal, and (3) retain physical integrity, especially insulation properties under a load of about 17 psi at 700° C.

For certain industrial applications, one or more of the above criteria have been found desirable and indeed necessary. There is a need for a pulverulent borosilicate composition that may be cellulated to form a cellular body that has one or more or all of the foregoing criteria.

SUMMARY OF THE INVENTION

This invention is directed to a pulverulent borosilicate composition that comprises by weight an admixture of between about 80 and 88 percent $SiO_2$, between about 1 and 3 percent $K_2O$, between about 7 and 13 percent $B_2O_3$ and about 4 percent $Al_2O_3$. The $SiO_2$ is preferably an amorphous precipitated hydrated silica, and the $Al_2O_3$ is preferably a finely ground alpha monohydrate prepared by thermal dehydration of an amorphous aluminum hydroxide.

The borosilicate composition is formed by first dissolving boric acid in boiling water and forming a solution thereof. A slurry of potassium hydroxide, amorphous precipitated hydrated silica and alumina is separately formed and intimately mixed by high shear mixing. The boric acid solution is added to the slurry, and additional silica is thereafter added to the slurry to form a slurry having about 22 percent by weight solids. The slurry is thereafter dried preferably in a spray drier to form aggregates of the solid constituents in the slurry. The aggregates may, where desired, be subjected to size degradation by crushing or the like and are thereafter introduced into a calciner. The calciner is preferably a plasma arc furnace where the pulverulent material is subjected to a calcining elevated temperature and quickly quenched to prevent devitrification. Where conventional calcining techniques are employed, the calcined material is also rapidly quenched to avoid devitrification of the calcined material. The calcined material is then introduced into a crusher, such as a ball mill. A carbonaceous cellulating agent is admixed with the calcined pulverulent material in the crusher and thereafter introduced into a cellulating furnace. The admixture is subjected to an elevated cellulating temperature where the carbonaceous cellulating agent gasifies and forms small uniform cells in the borosilicate cellular body. The cellular body is thereafter suitably annealed and shaped to obtain a cellular borosilicate body having one or more of the previously discussed desirable properties. Where desired, the calcined borosilicate particles may be utilized as a borosilicate ceramic frit.

BRIEF DESCRIPTION OF THE DRAWINGS

The Drawing is a flow diagram of the process for forming the pulverulent borosilicate composition and the cellular borosilicate bodies without subjecting the constituents to conventional glass-making techniques.

DESCRIPTION OF THE PREFERRED EMBODIMENTS

The process for making a pulverulent borosilicate composition and cellular borosilicate bodies therefrom includes first forming a boric acid solution by admixing boric acid and water at an elevated temperature in a container 10. A heater 12 may be employed to elevate the temperature of the water to dissolve the boric acid and form a solution thereof.

In a separate tank or mixer 12, a slurry is formed of silica, preferably an amorphous precipitated hydrated silica, alkali metal hydroxide in the form of KOH, alumina, preferably in the form of an alpha monohydrate, and water. Sufficient alkaline metal hydroxide is added to the slurry to provide a pH of about 10. The slurry is subjected to high shear mixing by a mixer 14. The preselected amount of the boric acid solution is introduced into mixer 12 through conduit 16 and controlled by valve 18. After the boric acid solution is added and mixed with the slurry, additional silica is added to the slurry until the slurry contains about 22 percent solids by weight.

The slurry is then withdrawn from mixer 12 through conduit 20 and introduced into a drier 22. The drier 22 may be any conventional drier, however, a spray drier is preferred which removes the water from the slurry and forms discrete spherical agglomerates. Where a conventional pan drier is employed, the dried agglomerates are then introduced into a crusher 26 where the agglomerates are reduced to a size suitable for calcining in the calciner 28. It has been found that spray drying forms spherical particles having a size less than 200 mesh Tyler Standard Screen, and the drying is fast enough to retain the $B_2O_3$ on the particles. Where pan drying is employed, a drying temperature schedule must be employed to retain the $B_2O_3$ on the aggregates.

The calciner 28 may be a conventional calciner where the particles are subjected to a temperature of about 1400° C for a sufficient period of time to fuse the particle. The calcining temperature is controlled by the devitrification of the particles. Where the calcining temperature is too low, there is a tendency to grow cristobalites; and devitrification occurs. Also, when the calcined particles are not immediately quenched, devitrification occurs. An arc plasma furnace is preferably employed as the calciner, and the pulverulent material is subjected to a plasma jet at about 13,000° K. The plasma jet is created by electrical arcing between carbon electrodes. A description of a suitable plasma furnace may be found in Chemical Engineering, Nov. 24, 1975, beginning on Page 56. One advantageous feature of the plasma furnace is that the pulverulent calcined material is subjected to quenching immediately after it leaves the plasma jet. Where other types of calciners are employed, it is desirable to subject the calcined material to a quenching step in a quencher 30 immediately following calcination.

The calcined and quenched material is then introduced into a crusher and mixer 32, such as a ball mill; and a carbonaceous cellulating agent is added and mixed with the calcined material. The calcined material is crushed to a fine size of about 2 microns and is admixed with the cellulating agent to form a borosilicate glass powder suitable for cellulation. It should be noted that the cellulating agent is a carbonaceous cellulating agent, and the addition of antimony trioxide is not required for foam densities of 20 pcf or more.

The mixture of borosilicate glass powder and carbonaceous cellulating agent is then introduced into a cellulating furnace 34 where the admixture of borosilicate glass powder and carbonaceous cellulating agent is subjected to an elevated temperature of between 1350° and 1400° C. Preferably, the kiln furniture, because of the high temperature, may be made from graphite or silicon carbide. The admixture coalesces and cellulates in the furnace to form a cellular borosilicate body which may also be referred to as a cellular ceramic. The cellular borosilicate body is thereafter annealed and shaped for use as thermal insulation and has the previously discussed properties.

The silica in the above-described borosilicate composition is preferably a colloidal silica of a micron size. A fumed silica formed by the burning of $SiFL_4$ or $SiCL_4$ may be used. A preferred silica is an amorphous precipitated hydrated silica sold by PPG Industries, Pittsburgh, Pennsylvania, under the trademark, Hi-Sil EP. This amorphous precipitated hydrated silica has a surface area (B. E. T.) of between 50 – 70 sq. m./gm. A typical analysis of this amorphous precipitated hydrated silica is as follows:

$SiO_2$ (as shipped, dry basis): 94.0 %
NaCl: 1.7 %
CaO: 0.80 %
$R_2O_3$ (Fe + Al): 0.63 %
pH in 5% Water Suspension: 7.0
Loss at 105° C. (as shipped): 5.3 %
Cu and Mn (Combined Total): 0.003%
Surface Area (B. E. T.): 60 sq. m./gm.
Ultimate Particle Size: 0.04 microns
Refractive Index: 1.46
DBP Absorption: 182 ml/100 gm.
% Retained on 325 Mesh:
   0.3 (pellets)
   0.07 (powder)

It is believed that the high surface area of the amorphous precipitated silica contributes substantially to forming an intimate admixture with the alumina and further provides a substantial area that may be coated with $B_2O_3$ flux.

Any suitable alumina of colloidal size may be used as a constituent for the borosilicate composition. A preferred alumina is a pseudo-boehmite or alpha monohydrate of colloidal size. The boehmite is prepared by the thermal dehydration of a gibbsite (bayerite, an amorphous aluminum hydroxide). The material has a range of surface areas from 15 m²/g to 400 m²/g. The preferred alumina sold by Kaiser Chemicals, Baton Rouge, Louisiana, under the trade name, Substrate Alumina — sa, has a B. E. T. of between 300 – 350 m²/g. The typical chemical analysis of the alumina is as follows:

$Na_2O$ (as is): 0.01% — 0.08%
Bayerite (as is): 0.000% — 3.00%
$Fe_2O_3$ (1000° C): 0.020% — 0.02%
$SiO_2$ (as is): 0.100% — 0.10%
Cl (as is): 0.010% — 0.01%
$SO_4$ (as is): 0.050% — 0.05%
$AL_2O_3$: Remainder The typical physical properties of the alumina are as follows:
Bulk density, lbs/ft³, calcined at 1100° F — 12.5 - 17.
Surface Area (1100° F, 1 hr), m²/gm — 340 – 300
Pore Volume (15,000 psia, 1100° F, 1 hr) cc/g — 1.5 – 1.0
Loss on ignition, % (from ambient to 1000° C) — 25

The alumina is principally used as a catalytic grade alumina substrate which is formed into spheres, extruded, or tabulated. The alumina is a high-chemical purity alumina powder having a low density and high surface area which can be formed into a variety of shapes ready for impregnation with a variety of active catalytic agents. One of the principal functions of the colloidal alumina in the borosilicate composition is to minimize devitrification of the composition subsequent to calcination.

The alkali metal hydroxide is preferably potassium hydroxide since the potassium ion has several advantageous properties. Since the potassium hydroxide is strongly basic, it increases the pH of the slurry to facilitate forming a high solids slurry from the constituents. The potassium hydroxide further serves as a flux in the composition; and of greater importance, however, it increases the corrosion resistance of the borosilicate composition. With the potassium in the composition, the cellular borosilicate body has a greater resistance to corrosion by nonferrous liquids. The potassium further serves as a poison to the reaction between the silica and nonferrous liquid metals.

The boric acid in the form of $B_2O_3$ is absorbed onto the surface of the colloidal particles and serves as a flux in the composition. The $B_2O_3$ is preferably supplied as a boric acid solution to the slurry.

It has been discovered that the above borosilicate composition may be formed in accordance with the above-described process without subjecting the constituents to the conventional glass-making techniques, such as mixing and melting. The melting temperature of composition containing about 88 percent $SiO_2$ by weight is about 1750° C. To provide a melting tank for this type of composition is both expensive and difficult to control during the melting process. Further, the melt is difficult to handle due to its high viscosity. With the above process, the colloidal particles of silica and alumina with the other constituents are first intimately mixed as a slurry and thereafter dried. The dried particles are thereafter calcined at the melting temperature. Because the particles are an agglomeration of colloidal sized particles, the temperature for calcination is substantially less than the temperature required to melt the constituents. To cellulate the admixture of borosilicate composition and the cellulating agent, it is necessary to subject the admixture to a foaming temperature of the composition for a period of time until the pulverulent borosilicate material coalesces, and the cellulating agent gasifies to form the cells in the coalesced material.

It has been discovered, however, that the temperature for cellulation is reduced substantially by using the herein described process for preparing the borosilicate composition. For example, when the borosilicate composition contains 88 percent by weight $SiO_2$, the theoretical cellulating temperature is 1425° C the borosilicate composition is prepared by conventional glass-making techniques, such as mixing and melting. Surprisingly, however, the cellulating temperature of this composition is reduced to 1345° C when the borosilicate composition is made according to the hereinbefore described process.

Conventional cellulating agents for both soda lime and borosilicate glasses include a carbonaceous material, such as graphite, pulverulent carbon and antimony trioxide. Surprisingly, it was discovered that antimony trioxide is not a prerequisite constituent of the cellulating agent when foam densities in excess of 20 pcf are required. The antimony trioxide is expensive, and its elimination reduces the costs of the composition.

The cellular borosilicate body has utility as an insulation that is subjected to high temperatures, such as temperatures in excess of 700° C. The cellular insulation retains its physical integrity under loads in excess of 20 psi at that temperature. The insulation resists degradation or attack from liquid, nonferrous metals, especially at the interface between an electrolytic salt bath and a liquid metal. The cellular insulation made in accordance with the above-described process resists degradation by an electrolytic salt bath and corrosive gases at the elevated temperatures of liquid, nonferrous metals.

Where desired, the cellulation of the pulverulent borosilicate composition may take place on a layer of sintered borosilicate glass to thereby provide a composite of a layer of noncellular borosilicate glass with a layer of cellular borosilicate composition fused thereto. The borosilicate glass layer then serves as the surface which contacts the liquid, nonferrous metal at the interface between the electrolytic salt bath and liquid, nonferrous metal. The sintered borosilicate glass layer is formed from the identical composition without the cellulating agent.

EXAMPLES

Compositions containing the following constituents expressed in percent by weight were prepared according to the above process and exhibited in varying degrees the above-discussed desirable properties. Example 6, for example, provided a cellular borosilicate composition clad by a glass layer that prevented liquid nonferrous metal penetration beyond 1/16 of an inch of the surface in a one week test at 710° C and supported a load in excess of 17 psi at that temperature. In addition, this foamed composition resisted any attack by a fused mixed chloride salt bath kept agitated by chlorine gas for one week at 710° C.

EXAMPLES

| | $SiO_2$ | $K_2O$ | $Al_2O_3$ | $B_2O_3$ | Strain Point ° C | Thermal Expansion 0–300° C $\times 10^{-7}/°$ C |
|---|---|---|---|---|---|---|
| 1. | 83 | — | 4 | 13 | 615 | 13.7 |
| 2. | 82 | 1 | 4 | 13 | 591 | 18 |
| 3. | 81 | 2 | 4 | 13 | 571 | NA |
| 4. | 80 | 3 | 4 | 13 | 551 | NA |
| 5. | 85 | 1 | 4 | 10 | NA | 14.9 |
| 6. | 88 | 1 | 4 | 7 | 682 | 12.4 |

According to the provisions of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A pulverulent borosilicate composition consisting essentially of an admixture of silica, alumina, boric acid and an alkali metal hydroxide in which, said boric acid is in the form of $B_2O_3$ and said alkali metal hydroxide is in the form of $K_2O$, and said composition contains between about 80 and 88 percent by weight $SiO_2$, between about 7 and 13 percent $B_2O_3$, between about 1 and 3 percent by weight $K_2O$ and about 4 percent $Al_2O_3$.

2. A pulverulent borosilicate composition as set forth in claim 1 in which, said silica is an amorphous precipitated hydrated silica having a surface area (B. E. T.) of at least 50 $m^2/gm$.

3. A pulverulent borosilicate composition as set forth in claim 1 in which, said alumina is an alpha monohydrate having a surface area (B. E. T.) of between 300 and 350 $m^2/g$.

4. A pulverulent borosilicate composition as set forth in claim 1 in which, said silica is an amorphous precipitated hydrated silica having a surface area (B. E. T.) of at least 50 $m^2/gm$., and said alumina is an alpha monohydrate having a surface area (B. E. T.) of between 300 and 350 $m^2/g$.

* * * * *